United States Patent [19]

Himes

[11] 4,060,510
[45] Nov. 29, 1977

[54] DRY BLENDING PROCESS

[75] Inventor: Glenn R. Himes, Houston, Tex.

[73] Assignee: Shell Oil Company, Houston, Tex.

[21] Appl. No.: 729,241

[22] Filed: Oct. 4, 1976

[51] Int. Cl.$^2$ .................... C08K 5/01; C08L 53/02
[52] U.S. Cl. .................... 260/33.6 AQ; 12/142 RS; 260/34.2; 260/42; 260/876 B
[58] Field of Search ............... 260/33.6 AQ, 34.2, 42, 260/876 B

[56] References Cited

U.S. PATENT DOCUMENTS

| 3,877,101 | 4/1975 | Lewis | 12/142 RS |
|---|---|---|---|
| 3,985,702 | 10/1976 | Himes | 260/33.6 AQ |

Primary Examiner—Melvyn I. Marquis
Assistant Examiner—H. H. Fletcher
Attorney, Agent, or Firm—Dean F. Vance

[57] ABSTRACT

An improved process for the dry blending of block copolymer-based compositions is disclosed which process comprises dry blending the various components at a temperature between about 175° F and 250° F.

8 Claims, No Drawings

DRY BLENDING PROCESS

BACKGROUND OF THE INVENTION

The use of elastomeric materials such as synthetic rubber in the manufacture of molded articles such as shoe components has long been known. Such materials have high coefficients of friction and groundgripping properties and are very flexible at low or ambient temperatures. With most types of rubber, however, it is necessary to compound them with vulcanizing agents and subject the compounds to mastication followed by molding operations in the presence of sufficient heat and for a time sufficient to effect vulcanization. Of course, for some end uses, other polymers such as polyvinylchloride may be employed. The latter type of polymer, however, exhibits certain undesirable characteristics for end uses such as footwear due for example, to high wet slip and cold stiffness.

In recent years, a number of block polymers have been developed which are elastomeric and which exhibit the stress-strain properties of vulcanized rubber without having been chemically vulcanized. This special class of polymers is referred to as thermoplastic elastomers, since they not only exhibit typical elastomeric properties but also may be processed in equipment normally employed for the processing of ordinary thermoplastic polymers such as polystyrene or polyolefins.

The most highly developed types of block copolymers include linear or branched species having thermoplastic polymer blocks interspersed with elastomeric polymer blocks. Typical examples of these include block copolymers of monoalkenyl arenes with conjugated dienes as well as certain hydrogenated derivatives thereof. Other suitable thermoplastic elastomers comprise olefinic block polymers having blocks of ethylene or propylene combined with olefin copolymer blocks. Typical commercial materials include those sold under the tradename KRATON ® Thermoplastic Rubber by Shell Chemical Company. The latter block copolymers comprise polymer blocks of monoalkenyl arenes such as styrene combined with elastomeric polymer blocks of conjugated dienes or a hydrogenated polymer block of a conjugated diene.

Suitable methods for the preparation of block copolymer thermoplastic elastomers may be found in the following patents:
U.S. Pat. No. 3,265,765
U.S. Pat. No. 3,333,024
U.S. Pat. No. Re. 27,145
U.S. Pat. No. 3,594,452
U.S. Pat. No. 3,726,944
U.S. Pat. No. 3,244,664

Because of their desirable combination of physical properties, these thermoplastic elastomers have found ready acceptance in numerous molding processes and particularly in the shoe industry as well as pharmaceutical, automotive and sporting equipment.

In the past, the thermoplastic elastomers have generally been compounded with other components such as fillers, extenders, plasticizers and the like in a kneading-type of mixer such as a Banbury Mixer. Such mixers entail high power requirements and the compounded mixtures must thereafter be further treated to form nibs or pellets, which are then utilized in well-known molding machines such as injection molders and the like. This type of compounding is termed "melt blending" since the components are heated to such an extent that the mixture is in the form of a homogeneous melt so that the various component particles coalesce together. See e.g., U.S. Pat. No. 3,299,174, where the melt blending of the various components occurs at temperatures in excess of about 170° C or 338° F.

The most recent type of compounding process to be employed is referred to as dry blending. Dry blending generally refers to a low shear mixing process wherein the compounding ingredients are blended together without the formation of a coherent mass and which results in a relatively free-flowing hetereogeneous mixture of ingredients in particulate form. However, the generally known processes for dry blending, such as those disclosed in U.S. Pat. No. 3,877,101, and in copending application Ser. No. 581,197, filed May 27, 1975 (having a common inventor and a common assignee) U.S. Pat. No. 3,985,702 do not always result in mixtures sufficiently free-flowing to be transferred to storage vessels or to further processing machines such as injection molders. Such flow problems frequently occur with mixtures containing high amounts of plasticizer, such as an extending oil. For example, when the various components for a shoe composition having about 150 parts of oil per hundred parts of neat rubber, are dry blended at the temperatures called for in the above two references (temperatures not to exceed 170° F), the composition does not easily flow through the cooling vessel which follows the mixer, nor from subsequent hoppers and storage containers which vessels comprise an integrated dry blending operation. A critical temperature range for dry blending has now been found that greatly improves the processability of such block polymer formulations.

SUMMARY OF THE INVENTION

The present invention is a process for making a thermoplastic rubber composition which comprises dry blending a block copolymer, inorganic filler, thermoplastic polymer and plasticizer at a temperature of between about 175° F and about 250° F, preferably between about 190° F and about 210° F. The temperature of dry blending is particularly critical. At temperatures below 170° F, the components may be well mixed, but the resulting mass does not flow easily from the various vessels through which it must be processed. At temperatures greater than about 250° F, the particles begin to coalesce resulting in a sticky mass that will not easily flow.

The present invention prevents bridging and consequent interruption of flow of thermoplastic rubber dry blend compounds in hoppers, storage vessels and the like. The invention also prevents formation of agglomerated, poorly circulating dry blend material in cooling vessels and reduces the severity of residue build-up in dry blend mixers, coolers and hoppers. Still further, the present invention prevents starving of injection molding machine screws due to lack of sufficient flow of dry blends from machine hoppers and minimizes the need for artificial flow promoting devices in hoppers and storage vessels, such as air pads, evassers, air cannons, vibrators and the like.

DETAILED DESCRIPTION OF THE INVENTION

Dry blending (also known as dry mixing) comprises mixing suitable thermoplastic elastomeric particles, thermoplastic polymer particles, and a plasticizer, together with other special compounding ingredients such as fillers, resins, colorants, antioxidants, fire retardants and the like.

The equipment for dry blending is essentially the same as that employed in the dry blending of polyvinyl chloride. While the equipment preferably combines mixtures of the high intensity types such as the German Henschel or Papenmeier types, better known as the Prodex or Welex machines, respectively, in the United States, other suitable apparatus is also known in the art. Less intense types of dry blending equipment have been found unexpectedly suitable, such as drum tumblers, ribbon blenders or rotary mixers similar to cement mixers.

The thermoplastic elastomers employed in the present composition are block copolymers and have at least two monoalkenyl arene polymer end blocks A and at least one elastomeric conjugated diene polymer mid block B. The number of blocks in the block copolymer is not of special importance and the macromolecular configuration may be linear, graft or radial (branched) depending upon the method by which the block copolymer is formed. For highly oil-extended compounds a high molecular weight branched block copolymer may be preferred. Typical block copolymers of the most simple configuration would have the structure polystyrene-butadiene-polystyrene and polystyrene-polyisoprene-polystyrene. A typical radial polymer would comprise one in which the diene block has three or more branches, the tip of each branch being connected to a polystyrene block. See U.S. Pat. No. 3,594,452. Expressed another way, the invention also contemplates (but is not limited to) the use of configurations such as A—B—B—A)$_n$ where $n$ varies from 1 to 5. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene.

The average molecular weights of each of the blocks may be varied as desired. The monoalkenyl arene polymer blocks preferably have average molecular weights between about 5,000 and about 125,000, more preferably between about 15,000 and about 100,000. The elastomeric conjugated diene polymer blocks preferably have average molecular weights between about 15,000 and about 250,000, more preferably between about 25,000 and about 150,000. The average molecular weights of the polystyrene end blocks are determined by gel permeation chromatography, whereas the polystyrene content of the polymer is measured by infrared spectroscopy of the finished block polymer. The weight percentage of the thermoplastic monoalkenyl arene blocks in the finished block polymer should be between about 8 and 55%, preferably between about 20% and about 50% by weight. The general type and preparation of these block copolymers are described in U.S. Pat. No. Re. 28,246 and in many other U.S. and foreign patents.

The block copolymers useful in the compositions of this invention may also be hydrogenated either selectively, randomly or completely. Selected conditions may be employed, for example, to hydrogenate the elastomeric diene center block while not so modifying the monoalkenyl arene polymer blocks. Two examples of hydrogenated polymers are polyvinylcyclohexane-hydrogenated polybutadiene-polyvinyl cyclohexane and polystyrene-hydrogenated polybutadiene-polystyrene. Preferably, blocks A are characterized in that no more than about 25% of the original aromatic double bonds are reduced by hydrogenation while blocks B are characterized by having at least 75% of the aliphatic double bonds reduced by hydrogenation. See generally U.S. Pat. No. 3,595,942.

An important blending component is the thermoplastic polymer. In the present specification and claims, the term "thermoplastic polymer" is distinguished from the term "thermoplastic elastomer" or "thermoplastic rubber" in that the thermoplastic polymers are defined as non-elastomeric polymers. These thermoplastic polymers have the generally well-known characteristics of ordinary thermoplastics and include poly(styrene), poly(ethylene), poly(propylene) and copolymers of ethylene and vinyl acetate. The amount of thermoplastic polymer typically employed varies from about 25–150 phr, preferably about 50–115 phr. The term "phr" is well known, and means parts by weight per 100 parts by weight rubber (or block copolymer as in the present case).

The thermoplastic elastomer and polymer are typically ground to a particular size before use in the dry blending process. In forming the small particles of either the elastomer or polymer, it is important to effect the particle-size reductions in such a manner as to minimize the possibility of thermal and mechanical degradation. Preferably, this is done by granulating the two types of materials in high shear, low impact, rotary cutting granulators such as those sold by Wedco Inc., Cumberland Engineering Co., Entoleter Inc., Amacoil Machinery Inc., and Metalmecconica Plastic S.A. of Italy, and others which are known in the art. Preferably, the thermoplastic elastomer and polymer are reduced to a particle below three-sixteenths of an inch, preferably to pass a standard 10–30 mesh screen. The average particle size varies from between about 0.1 mm and about 2.0 mm. These particles, of course, may be inherently formed in the polymerization process in the correct particle size. Another means of forming the small particles comprises addition of a non-solvent for a rubber or polymer solution in such a way as to form a powdered precipitate. For economic reasons, it is preferred to utilize the largest particle size which will give the desired degree of dispersion in the eventually molded articles. The optimum particle size may vary with the specific molding apparatus and molding conditions used.

Plasticizers are also employed in the compositions. Preferred plasticizers are hydrocarbon rubber extending oils. These hydrocarbon rubber extending oils, usually referred to as paraffinic/naphthenic oils, are usually fractions of refined petroleum products having less than about 30% by weight of aromatics (by clay-gel analysis) and usually have viscosities between about 100 and 500 SSU at 100° F. Commercial extending oils include SHELLFLEX ® oils, No's. 310, 371 and 311 (which is a blend of 310 and 371). The amount of extending oil employed varies from about 5–175 phr, preferably from about 75–160 phr.

Additional resins are also employed in the present compositions. The additional resins employed herein are high softening point resins that are compatible with the monoalkenyl end blocks of the block copolymer and include polymers of alphamethyl styrene, copolymers of alphamethyl styrene and vinyltoluene, coumarone-indene resins, polyindene resins, and poly(methyl indene) resins. The amount of end block compatible resin employed varies from about 0-90 phr, preferably 5-40 phr.

The fillers used in the present compositions are well known in the art and include clay, talc, titanium dioxide, carbon blacks, calcium carbonate, and other pigments as well as fibrous fillers such as cellulosic fibers, sawdust, ground cork, etc. Preferred fillers include clay, talc and calcium carbonate. The amount of filler employed varies from 0-150 phr, preferably 10-110 phr. Additional minor amounts of antioxidants, ultra-violet stabilizers, fire retardants and the like may also be added.

Generally, the ingredients other than the plasticizer are added in the dry state and placed in the mixer. The temperature of the charged mixture is typically ambient temperature. During the initial mixing (0 to 60 seconds, preferably 5 to 45 seconds) in the absence of plasticizer, frictional heat increases the temperature of the mixture to between about 100° F and 150° F. After the initial mixing of the ingredients, the plasticizer oil is added. By delaying the addition of the oil until after the other ingredients have been briefly mixed, localized heavy concentrations of oil in one component or another is prevented and the oil is absorbed into the mixture more uniformly. The mixing of the ingredients continues then until the particles are well mixed (typically about 3 to about 7 minutes) and the temperature is within the desired discharge temperature range — about 175° F to about 250° F. However, it is also permissible within the scope of the invention to vary the order of adding the ingredients, as long as the discharge temperature is within the desired range. In addition, an external heating source, such as steam jacketing of the mixer, or feed pre-heaters, may be employed to reach the desired dry blending temperatures.

Compositions in which the thermoplastic rubber is highly extended with non-rubber components; such as 150 phr oil, 110 phr inorganic filler and 105 phr polystyrene, plus antioxidants and colorants; are typically mixed to a final batch temperature of about 180° F to provide free-flowing characteristics in the resultant dry blend. Compositions of greater extension may require final batch temperatures of 190° F or higher to provide free-flowing character. The proper final batch temperature is above the point at which free oil disappears (i.e., is absorbed) from the batch. This point is indicated by an increase in current demand on the mixer motor and a relatively rapid improvement in the flowability of the mixing batch. Optimum final batch temperature is roughly 10 to 15 Fahrenheit degrees above this transition. For economies of subsequent cooling, final batch temperature should be the lowest temperature at which free-flowing dry blends are obtained. Otherwise, higher temperatures are not harmful until they exceed about 250° F, when particles will begin to coalesce due to heat-induced surface tack.

Other factors also affect optimum final batch temperature; for example, the mid-block derived from a conjugated diene. Since the diene mid-block is the primary absorber of oil (rather than the polystyrene end-blocks), a greater mid-block content will hasten the absorption of oil and reduce the required final batch temperature. Similarly, fillers having a high affinity for oil, or a higher total level of fillers, will reduce the required final batch temperature.

After the cooling step the dry blended composition may be stored for subsequent use, or the composition may be transported directly to a forming process. The formation of footwear is especially contemplated, and the injection molding of footwear is particularly recommended. However, the dry blended compounds may be treated by other molding operations such as extrusion or calendering. The formation of slab soling, for instance, results in an extruded or calendered sheet from which footwear soles or heels may be stamped. Reference is made to U.S. Pat. No. 3,589,036 for suitable variations in compounding and footwear formation. Suitable commercial footwear injection molding machines include those manufactured by Desma, Bata, and Gesta.

The invention is further illustrated by reference to the following Illustrative Embodiment, which is presented for the purpose of illustration only, and the invention is not to be limited to the particular ingredients and operating conditions disclosed.

ILLUSTRATIVE EMBODIMENT I

The following composition was dry blended with final batch temperatures of 160° F, 170° F and 180° F.

|  | Parts by Weight |
|---|---|
| KRATON ® Rubber 4140 | 156 |
| Naphthenic Oil | 95 |
| Polystyrene | 110 |
| Talc | 55 |
| Whiting | 55 |
| Antioxidant | 0.4 |
| Titanium Dioxide | 7.0 |

KRATON ® Rubber 4140 is a styrene-butadiene block copolymer.

The mixer was a Welex Model 500M with no cooling or heating medium circulating in the mixer jacket. Impeller rpm was 550. Initially all ingredients except oil were charged to the mixer and mixed for 15 seconds. At this point the oil was pumped into the mixing chamber and the mixer allowed to run until batch temperature reached the intended level. The batches were then discharged into a Welex cooler. The batch discharged at 160° F subsequently coalesced in the cooler into a coherent, non-flowing mass and was removed from this vessel only with difficulty. The batch discharged at 170° F briefly coalesced in the cooler but later became more free-flowing. However, when this batch was discharged from the cooler into a surge hopper, it bridged and would not flow from this vessel. Only repeated probing of the bridged material with an object such as a metal rod or wooden dowel dislodged the blocked composition and restored flow. The batch discharged from the mixer at 180° F flowed freely throughout the cooling period and also feed readily out of the surge hopper to a pneumatic conveying line where it could be transported to injection molding equipment.

After the mixing process, the dry blended composition is usually cooled to 100° F or less to prevent particle agglomeration and heat-induced degradation of the polymeric components. It has been observed that the improved flow characteristics of dry blends prepared according to this invention provide more efficient cooling and lead to less residue build-up in cooling vessels.

what is claimed is:

1. An improvement in the process for dry blending a polymeric composition in a mixing vessel, said composition having various components including:
    a. 100 parts by weight of a thermoplastic elastomer, said thermoplastic elastomer being a block copolymer having at least two monoalkenyl arene polymer end blocks A and at least one elastomeric conjugated diene mid block B, each block A having an average molecular weight between about 5,000 and about 125,000 and each block B having an average molecular weight between about 15,000 and about 250,000, said blocks A comprising 8-55% by weight of the copolymer, said block copolymer having an average particle size of between about 0.1 mm and about 2.0 mm, b. between about 25 and about 150 parts by weight of a thermoplastic polymer having an average particle size of between about 0.1 mm and 2.0 mm, and c. between about 5 and about 175 parts by weight of a plasticizer, which improvement comprises dry blending the various components at a temperature of between about 175° F and about 250° F.

2. A process according to claim 1 wherein said temperature is the discharge temperature of the polymeric composition.

3. A process according to claim 1 wherein said thermoplastic polymer is selected from the group consisting of poly(styrene), poly(ethylene), poly(propylene), copolymers of ethylene and vinyl acetate, and mixtures thereof.

4. A process according to claim 3 wherein said plasticizer is a hydrocarbon rubber extending oil.

5. A process according to claim 1 wherein the various components include from about 0 to about 150 parts by weight of a filler and from about 0 to about 90 parts by weight of an end block compatible resin.

6. A process according to claim 5 wherein said filler is selected from clay, talc, calcium carbonate and mixtures thereof.

7. A process for dry blending a polymeric composition which comprises:

a. adding 100 parts by weight of a thermoplastic elastomer, from about 0 to about 150 parts by weight of a filler, and from about 25 to about 150 parts by weight of a thermoplastic polymer to a mixing vessel at ambient temperature wherein said thermoplastic elastomer is a block copolymer having at least two monoalkenyl arene polymer end blocks A and at least one elastomeric conjugated diene mid block B, each block A having an average molecular weight between about 5,000 and about 125,000 and each block B having an average molecular weight between about 15,000 and about 250,000, said blocks A comprising 8-55% by weight of the copolymer, and wherein said thermoplastic elastomers and said thermoplastic polymer have average particle sizes of between about 0.1 mm and about 2.0 mm;

b. mixing the thermoplastic polymer, filler and thermoplastic elastomer for 0 to 60 seconds wherein the temperature of the resulting mixture increases to between about 100° F and 150° F;

c. adding from about 5 to about 175 parts by weight of a plasticizer to the mixing vessel; and d. mixing the resulting polymeric composition for between about 3 and about 7 minutes until the temperature of the polymeric composition has increased to between about 175° F and about 250° F.

8. A process according to claim 7 wherein:

i. said thermoplastic polymer is selected from the group consisting of poly(styrene), poly(ethylene), poly(propylene), copolymers of ethylene and vinyl acetate, and mixtures thereof;

ii. said plasticizer is a hydrocarbon rubber extending oil; and iii. said filler is selected from the group consisting of clay, talc, calcium carbonate and mixtures thereof.

* * * * *